July 19, 1949.  F. A. JENKS  2,476,301
FORMATION CONTROL
Filed May 31, 1943  5 Sheets-Sheet 1

INVENTOR
FREDERIC A. JENKS
BY
ATTORNEY

July 19, 1949.　　　　　F. A. JENKS　　　　　2,476,301
FORMATION CONTROL
Filed May 31, 1943　　　　　　　　　　　　　5 Sheets-Sheet 2
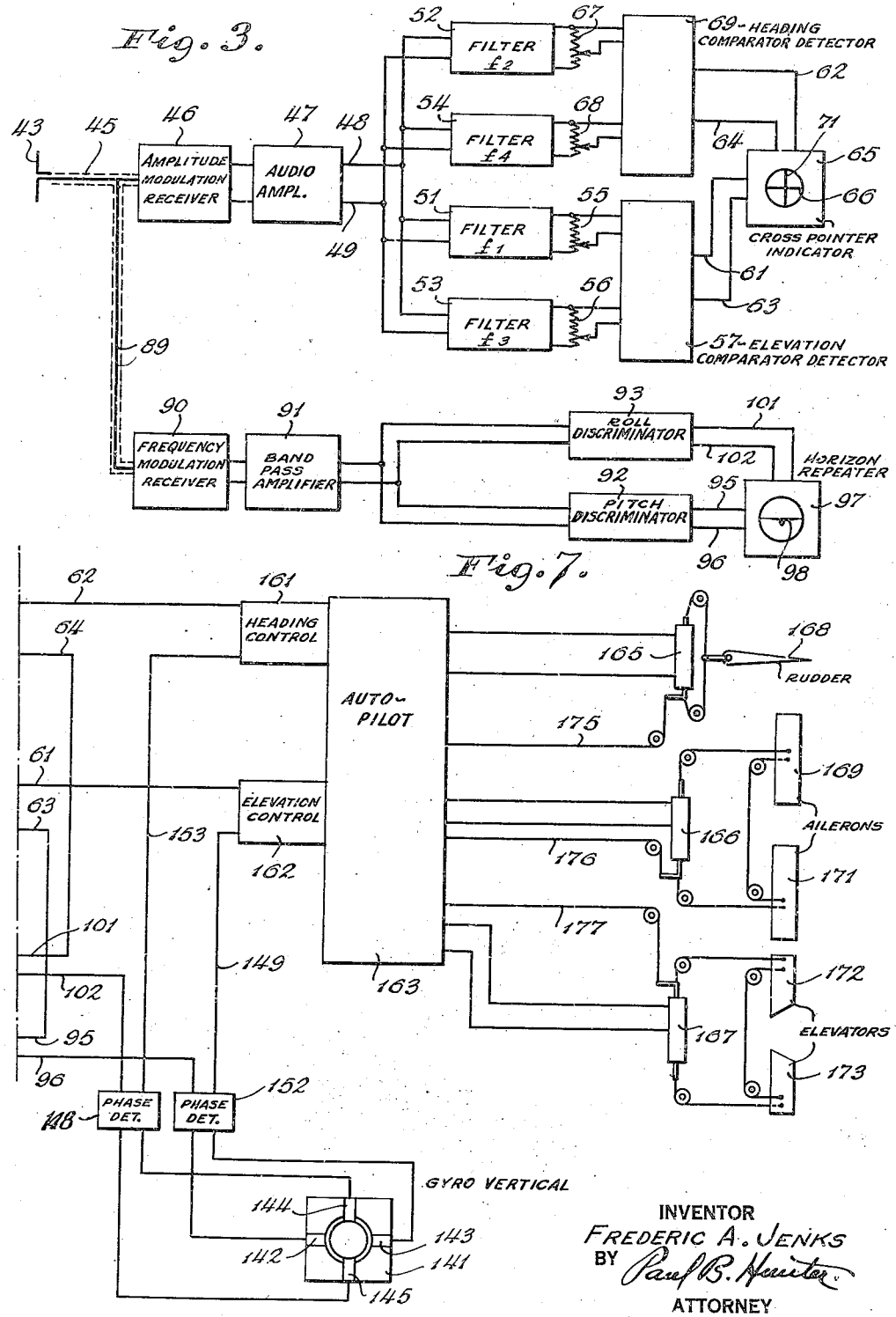

July 19, 1949. F. A. JENKS 2,476,301
FORMATION CONTROL
Filed May 31, 1943 5 Sheets-Sheet 3

INVENTOR
FREDERIC A. JENKS
BY
ATTORNEY

July 19, 1949.  F. A. JENKS  2,476,301
FORMATION CONTROL
Filed May 31, 1943  5 Sheets-Sheet 4

INVENTOR
FREDERIC A. JENKS
BY
ATTORNEY

July 19, 1949.  F. A. JENKS  2,476,301
FORMATION CONTROL
Filed May 31, 1943  5 Sheets-Sheet 5
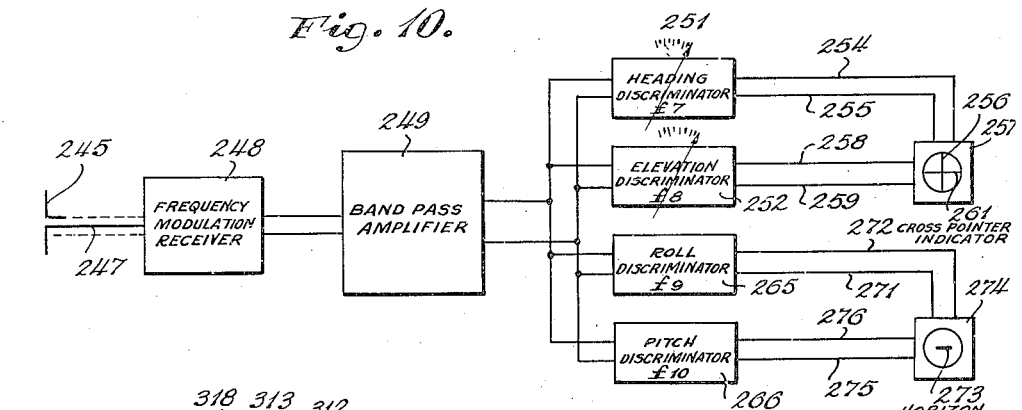
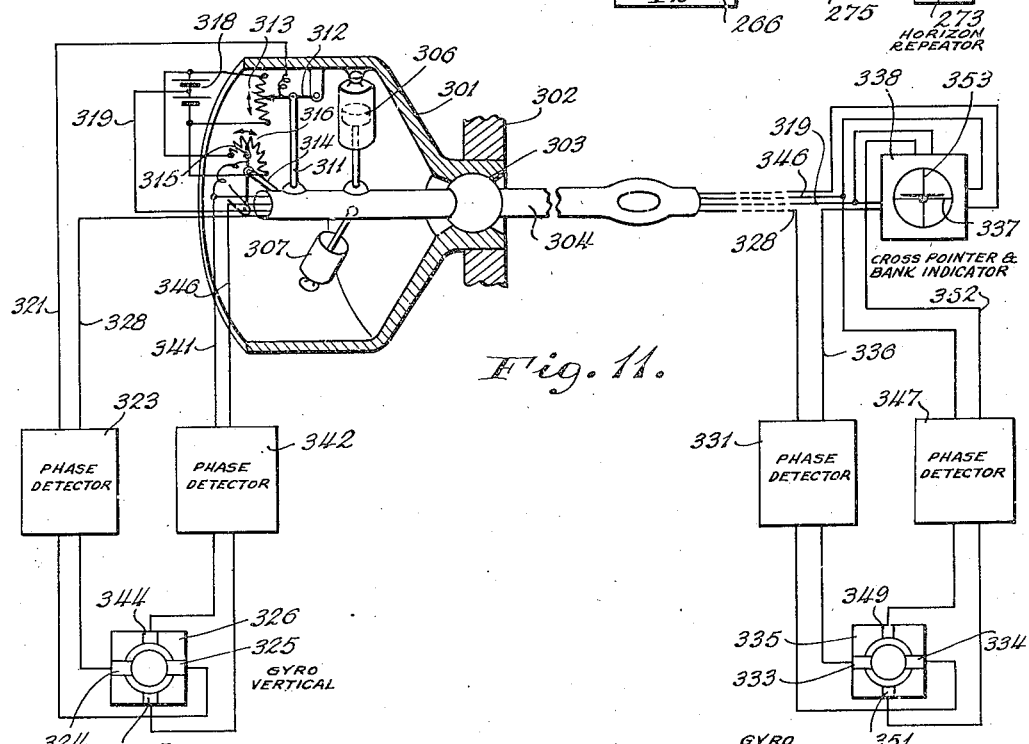
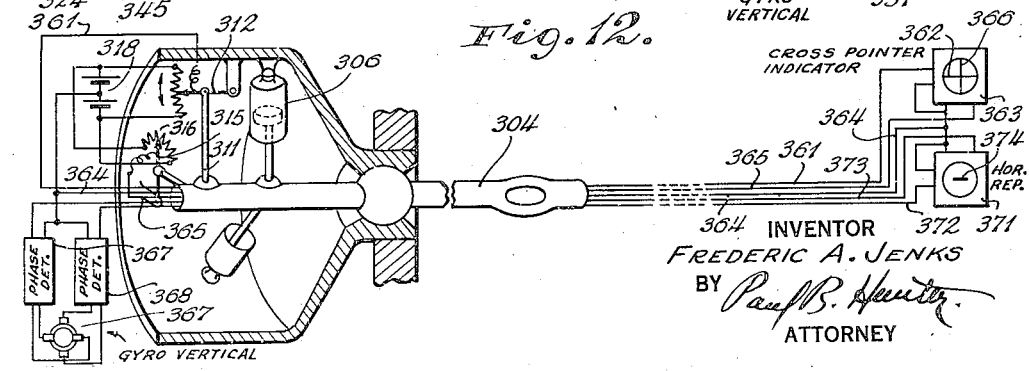
INVENTOR
FREDERIC A. JENKS
BY
ATTORNEY Patented July 19, 1949

2,476,301

UNITED STATES PATENT OFFICE 2,476,301

FORMATION CONTROL

Frederic A. Jenks, Rockville Centre, N. Y., assignor to The Sperry Corporation, a corporation of Delaware Application May 31, 1943, Serial No. 489,185

21 Claims. (Cl. 250—2)

This invention relates generally to a system for enabling a plurality of craft to maintain predetermined positions in a formation without depending upon visible contact. The invention relates particularly to apparatus for determining, indicating and controlling the position of each craft in a formation relative to a control or leading craft. The embodiments of the invention herein described are particularly applicable to formation flying and glider towing.

It is well known that poor visibility conditions place limitations on formation flying. In order to avoid a possibility of collision between various craft in the formation, and similarly in glider towing where one plane is towing a plurality of gliders, provision must be made to maintain the gliders in predetermined lateral positions relative to the towing craft.

It is therefore the main object of the present invention to provide a formation control system in which relative positions of various craft in the formation may be determined.

Another object of the invention is to provide indicators carried by the craft in a formation to indicate their positions relative to a control craft.

A further object of the invention is to provide a formation control system in which the various craft in a formation may determine the attitude of a control craft.

A further object of the invention is to provide a formation control system with automatic pilot means for maintaining craft in predetermined positions relative to a control craft.

A further object of the invention is to provide a control system for formation flying wherein compensation is effected for changes in the pitch and/or heading of a control craft.

Other objects and advantages of the invention will become apparent from the following specification, taken in connection with the accompanying drawings, wherein Fig. 1 is a schematic diagram of a transmitter for a control craft which defines a reference axis.

Fig. 3 is a schematic diagram of a receiver for use in connection with the transmitter of Fig. 1 for determining and indicating its position relative to a control craft and also the attitude of the control craft.

Fig. 7 is a schematic block diagram of a radio controlled automatic pilot that may be used with the receiver shown in Fig. 3.

Fig. 10 is a schematic diagram of a receiver adapted for use in connection with the transmitter shown in Fig. 8.

Fig. 11 shows apparatus adapted for use in glider towing for determining the positions of the gliders relative to the towing plane.

Fig. 12 shows a simplified glider towing system similar to that of Fig. 11.

The formation control system forming the present invention includes a transmitter carried by a control craft, which may be the leading craft of the formation, that defines a reference axis for all of the craft in the formation. The controlled or following craft have receivers for determining and indicating their positions relative to the reference axis defined by the transmitter in the control craft. The pilots of the controlled craft manipulate their controls to maintain their respective craft in a predetermined position relative to the reference axis of the control craft as shown by indicators in each of the controlled craft. Provision may also be made for using automatic pilots whereby the controlled craft are automatically maintained in a predetermined position.

Figures 1, 2:
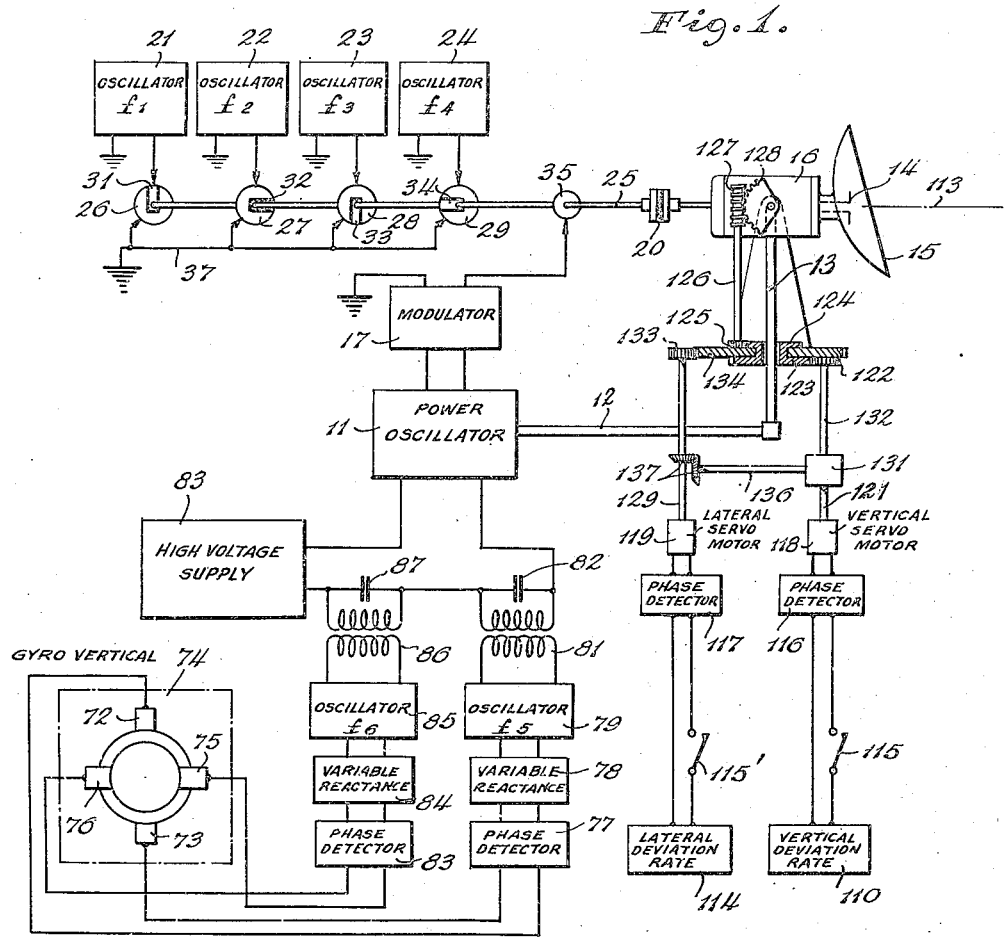
Fig. 2 is a cross-section of the beam patterns of the transmitter shown in Fig. 1.

One arrangement for defining the reference axis of the control system is shown schematically in Fig. 1 as a radio transmitter in which high frequency energy is developed by power oscillator 11 and transmitted through suitable wave guides 12 and 13 to a directional antenna 14 having a parabolic reflector 15 adapted to define a directional beam of radiant energy. A motor contained within housing 16 is adapted to rotate the reflector 15, which is arranged at an angle relative to the longitudinal axis of the antenna 14, to produce a conical radiant energy pattern.

As illustrated particularly in Fig. 1, the high frequency energy of power oscillator 11 is modulated by modulator 17 at short predetermined intervals during rotation of the reflector 15. Fig. 2 shows a cross-section of the modulated conical radiant energy pattern. The modulation is applied during four short intervals of each rotation of the reflector 15.

A different frequency is applied by the modulator 17 for modulating the high frequency carrier at each of the four intervals during a single revolution of the antenna 14. These frequencies, which will be referred to as $f_1$, $f_2$, $f_3$ and $f_4$, are applied by suitable conventional oscillators 21, 22, 23 and 24, designed to generate four suitable modulating frequencies, preferably in the audio range. These oscillators are connected to the modulator 17 through a commutator system on a shaft 25 driven through insulated coupling 20 from the motor 16. The shaft 25 makes one revolution for each revolution of the reflector 15. Four commutator discs 26, 27, 28 and 29 are carried by the shaft 25 and small segments 31, 32, 33 and 34 are insulated from their respective discs. The segments are displaced at 90° intervals for connecting the oscillators 21, 22, 23 and 24 for short periods to the shaft 25. Slip ring 35 connects the shaft 25 to modulator 17.

During each revolution of the shaft 25 the frequencies of the four oscillators are supplied for successive short periods to the modulator 17. During the intervals between modulation the four oscillators are short-circuited to a ground connection 37 by commutator discs 26, 27, 28 and 29.

When the beam pattern of the antenna 14 is at its maximum height, as shown in Fig. 2, frequency $f_1$ of the oscillator 21 is connected through segment 31 and shaft 25 and then through slip ring 35 to modulator 17. The modulation applied to the high frequency energy of power oscillator 11 has a frequency corresponding to the frequency $f_1$ of the oscillator 21. During the short period for which this modulating frequency is applied, the antenna 14 continues its rotation and hence produces a beam pattern such as that shown at 38 in Fig. 2. As the antenna continues its rotation, the unmodulated carrier is rotated about the longitudinal axis of the parabola 15 in conical fashion, as has been described, until the commutator segment 32 connects the shaft 25 to oscillator 22, at which time a second modulation frequency $f_2$ is supplied to the modulator 17 and thence to the power oscillator 11.

The beam pattern followed by the conical radiant energy pattern during the application of the second modulator frequency is shown at 39 in Fig. 2. In a similar manner, the oscillators 23 and 24 are connected to the modulator 17 and the modulation frequencies $f_3$ and $f_4$ are applied during short intervals as the radiant energy pattern of the antenna 14 continues to rotate. The beam patterns produced by these modulating frequencies $f_3$ and $f_4$ are shown at 41 and 42 (Fig. 2)

The axis of the motor-antenna assembly forms a reference axis for the entire formation of aircraft, and is represented by the center point of the beam patterns shown in Fig. 2. This axis is also the central axis of the conical pattern described by the energy radiated by the antenna. Obviously, other types of antennae may be employed to produce a similar pattern. The receivers carried by the various controlled or following craft in the formation detect the energy from the antenna 14 and compare the strength of the various modulating frequencies to determine their positions relative to the center axis of the beam patterns.

Fig. 3 shows one receiver suitable for this purpose. This receiver includes antenna 43 that is connected as by a coaxial cable 45 to a receiver 46. The wave envelope of the energy detected by the receiver is supplied to an audio amplifier 47. The output of the amplifier 47 as represented by leads 48 and 49, is connected in parallel to a plurality of filters 51, 52, 53 and 54, which are tuned to the modulation frequencies $f_1$, $f_2$, $f_3$ and $f_4$, respectively.

The outputs of the filters 51 and 53 are connected through suitable gain control devices, such as potentiometers 55 and 56, to an elevation comparator-detector circuit 57. Since the modulating frequencies $f_1$ and $f_3$ are applied at the upper and lower maximum points of the conical beam pattern, the strength of the signals received by the antenna 43 may be compared to determine the vertical displacement of the antenna 43 relative to the reference axis at the center of the transmitted beam patterns. The comparator-detector circuit 57 compares the amplitudes of frequencies $f_1$ and $f_3$ and produces a direct current output at leads 61 and 63 corresponding in direction and magnitude to the direction and vertical displacement of the antenna 43 relative to the reference axis of the beam pattern.

The leads 61 and 63 are connected to a suitable indicator, such as cross pointer indicator 65, that is well known in the art, to indicate whether the following plane should be directed upwardly or downwardly to maintain a predetermined position relative to the center of the beam pattern.

If it is desired to fly the controlled or following craft at a point displaced vertically relative to the center of the directional beam pattern, potentiometers 55 and/or 56 may be adjusted to attenuate one or the other of the frequencies $f_1$ or $f_3$. For example, if it is desired to fly a specific distance above the axis of the beam pattern, the output of the filter 51 is reduced by potentiometer 55 to attenuate the frequency $f_1$, so the signals supplied to the elevation comparator-detector 57 by potentiometers 55 and 56 are equal when the antenna 43 is displaced a predetermined distance above the center of the beam patterns. If the following craft is to fly below the center of the beam patterns, the potentiometer 56 is adjusted to reduce the signal corresponding to the modulating frequency $f_3$, whereby the elevation comparator-detector 57 receives equal signals when the antenna 43 is positioned at a specific point below the center of the beam patterns.

The pilot in the controlled craft manipulates his controls to maintain the horizontal pointer 66 of the cross pointer indicator 65 in a central position. Horizontal pointer 66 is centrally positioned when the outputs of filters 51 and 53 for frequencies $f_1$ and $f_3$ are equal and hence the potentials of leads 61 and 63 are equal with respect to a neutral point in the comparator-detector 57.

The outputs of filters 52 and 54 for modulating frequencies $f_2$ and $f_4$ are connected through potentiometers 67 and 68 to a heading comparator-detector 69. The output of the comparator-detector 69 as represented by leads 62 and 64, is connected to control a vertical pointer 71 of the cross pointer indicator 65. The vertical pointer 71 moves laterally depending upon the relative voltages of the output leads of the heading comparator-detector corresponding to the modulating frequencies $f_2$ and $f_4$ which are supplied by potentiometers 67 and 68. The signals may be adjusted by potentiometers 67 and 68, whereby the vertical pointer 71 will be centered when the controlled craft is displaced laterally a predetermined distance and in a predetermined direction relative to the reference axis of the beam patterns.

Once the potentiometers 55, 56 and 67, 68 are adjusted, the pilot, by maintaining the pointers 66 and 71 in the center of the cross pointer indicator 65, will automatically maintain the following craft carrying the antenna 43 in a predetermined position relative to the reference axis defined by the beam patterns.

Although the cross pointer indicator 65 is sufficient to maintain the following craft in a predetermined position relative to the reference axis defined by the transmitter carried by the control craft, it is difficult for the pilot to follow maneuvers of the control craft. An indication of the attitude of the control craft will enable the pilot of the following or controlled craft to anticipate maneuvers of the control craft, the energy radiated by the antenna is further modulated in response to changes in the attitude of the control craft.

This modulation of the energy radiated by the antenna 14 is accomplished by modulating the power oscillator 11 in accordance with signals from an attitude indicating device such as gyro vertical or artificial horizon 74, such as that described in Patent No. 2,262,245, of Moseley et al. issued November 11, 1941. Changes in attitude of the craft about the pitch axis cause pick-offs 72 and 73 to produce reversible phase and variable magnitude voltages corresponding to the direction and amount of pitch of the craft. Similarly, movements of the control craft about its roll axis cause pick-offs 75 and 76 to produce reversible phase and variable magnitude voltages corresponding to the direction and movement of the craft about the roll axis.

The pitch signals from the pick-offs 72 and 73 are supplied to a phase detector 77 which produces a direct current voltage having a direction and magnitude corresponding to the pitching movements of the craft. This voltage controls a variable reactance 78 which varies the frequency of an oscillator 79 above and below a selected center frequency that corresponds to level flight of the craft.

The variable frequency of the oscillator 79 is coupled by a transformer 81, having its secondary tuned by a condenser 82, to the circuit from high voltage supply source 83 to the power oscillator 11. The power oscillator may include a velocity modulated tube such as a "Klystron," the frequency of which can be varied by varying the applied voltage. Since the voltage applied to the power oscillator 11 is varied according to the variable oscillator 79, the frequency of the power oscillator is modulated by the frequency of the oscillator 79. In this manner, the frequency of the energy radiated by antenna 14 is modulated by a frequency that is varied according to the pitching movements of the control craft.

In a similar manner, the reversible phase variable magnitude voltage of pick-offs 75 and 76 corresponding to the rolling movements of the control craft is supplied to a phase detector 83 which controls a variable reactance 84 to adjust the frequency of an oscillator 85 above and below a center frequency depending upon the rolling movements of the craft. This varying frequency is coupled by a transformer 86, having its secondary tuned by a condenser 87, to the circuit of the high voltage supply source 83 for the power oscillator 11. Thus the frequency of the power oscillator 11 is also modulated by a frequency depending upon the position of the control craft relative to its roll axis.

Center frequencies $f_5$ and $f_6$ of the oscillators 79 and 85 must, of course, be selected so the ranges of the modulating frequencies will not overlap. These frequencies are preferably above the audible range in order to avoid interference with the frequencies used by modulator 17 to determine the reference axis of the control craft.

The antenna 43 of the following craft is connected by coaxial cables 45 and 89 to a frequency modulation receiver 90 which may include suitable limiter and demodulation circuits. The output of the receiver 90 is connected to a band pass amplifier 91 which amplifies the entire frequency range of the variable oscillators 79 and 85. In order to segregate pitch and roll signals, a suitable trap may be used to attenuate frequencies between the frequency ranges of the modulators 79 and 85.

The output of the band pass amplifier 91 is connected in parallel to pitch and roll discriminators 92 and 93, which are tuned to the center frequencies $f_5$ and $f_6$ of oscillators 79 and 85, respectively. These discriminator circuits may be of any suitable conventional design to produce a direct current output voltage having a sense or polarity and magnitude dependent upon the deviation of the received modulating frequency relative to their respective tuned frequencies.

The output of the discriminator 92 produces signals corresponding to pitching movements of the control craft which are supplied by leads 95 and 96 to a horizon repeater indicator 97 to control the vertical position of a miniature airplane 98 of the indicator. The vertical displacement of the miniature airplane 98 from its central position represents pitching movements of the control craft as determined by the gyro vertical 74 (Fig. 1).

In a similar manner, the output of the discriminator 93 as represented by leads 101 and 102 has a direction and magnitude corresponding to the rolling movements of the control craft. Leads 101 and 102 are connected to the horizon repeater indicator 97 to rotate the miniature airplane 98 in a manner to represent rolling movements of the control craft.

The output of the transmitter carried by the control craft is thus modulated by a varying frequency in accordance with its pitching and rolling movements, as determined by the gyro vertical 74. As shown, the variable frequencies of the modulators 79 and 85 are utilized to frequency modulate the carrier. However, the variable modulating frequencies could also be used for amplitude modulation of the carrier by making certain alterations in the transmitter and receiver circuits shown in Figs. 1 and 3. However, the result would be substantially the same and an instrument such as the horizon repeater 97 could be used to indicate the attitude of the control craft.

Figure 4A:
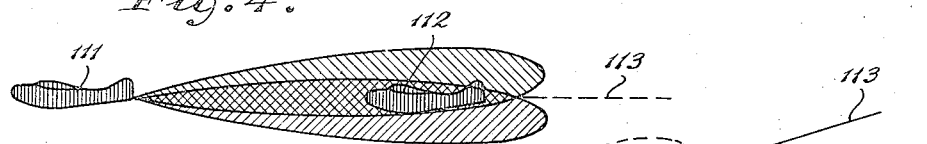
Fig. 4A is a diagram showing the reference axis defined by the beam pattern of a control craft in horizontal flight.
Figure 4B:
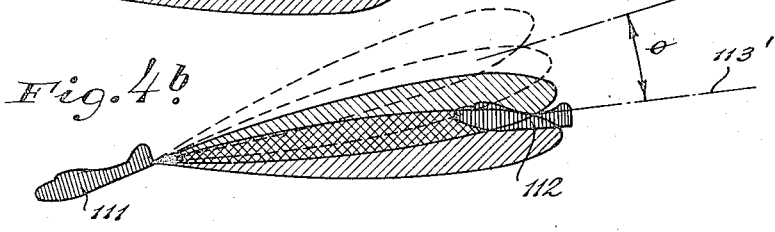
Fig. 4B is a similar diagram showing the error introduced by the beam pattern due to movements of the control craft.

Figs. 4A and 4B illustrate the introduction of certain errors in the reference axis as the control or leading craft 111 deviates from a straight line course to change its heading or elevation. As shown in Fig. 4A, a following craft 112 flying along the reference axis 113 of the beam pattern satisfactorily follows the leading craft during level flight. However, as the leading craft begins to change its elevation, as shown in Fig. 4B, the reference axis 113 is displaced upwardly so the following craft 112 receives a signal on its cross pointer indicator 65 to fly upwardly. This, of course, is opposite to the action which the pilot of the following craft 112 should take in order to follow the control craft 111. Similar errors are introduced as the leading craft 111 begins to change its heading. If it turns to the right, the axis 113 is displaced to the left and the following craft receives a signal to turn to the left, which is opposite to the signal it should receive. It is necessary, therefore, to compensate for the errors introduced by movements of the reference axis as the control craft begins to change its course in lateral and vertical directions.

The apparatus shown in Fig. 1 is designed to effect this compensation by closing switches 115 and 115' that are connected between vertical and lateral deviation rate devices 110 and 114, and phase detectors 116 and 117, which control vertical and lateral servomotors 118 and 119.

The deviation rate devices 110 and 114 may include any suitable rate measuring instrument for producing a signal corresponding to the rate of deviation of the control craft from a straight line course. Turning movements of the control craft result in a lateral deviation; hence a measurement of the rate of turn corresponds to the rate of lateral deviation. As the control craft begins to climb or dive, it changes pitch. The rate of change of pitch corresponds to the rate of vertical deviation. Once the control craft assumes a constant climb or dive angle, the rate of vertical deviation, or rate of change of pitch, becomes zero.

One example of an instrument suitable for use in the device 110 and 114 for measuring vertical and lateral deviation rates is described in U. S. Patent No. 2,309,853, issued February 3, 1943, to Joseph Lyman et al. This instrument produces an alternating voltage having a phase and a magnitude corresponding to the direction and rate of turn or deviation from a straight course. Such a reversible phase, variable magnitude voltage from vertical and lateral deviation rate devices 110 and 114 may be supplied through switches 115 and 115' to phase detectors 116 and 117 which control the vertical and lateral servomotors 118 and 119 to adjust the beam pattern of antenna 14 vertically and laterally by an amount corresponding to the changes in attitude of the control craft.

As the craft begins to climb or glide, the voltage of the vertical deviation rate device 110 acts through the phase detector 116 to actuate motor 118 which drives shaft 121 forming one input of a compensating differential 131. The output of the compensating differential 131 represented by shaft 132 rotates pinion 122 which meshes with a gear 123 to drive through gearing 124 and 125 to rotate a shaft 126. A worm gear 127 on the shaft 126 rotates a sector 128 to adjust axis 113 of the antenna 14 in a vertical direction.

When the control craft begins to turn, phase detector 117 is actuated by a voltage from the lateral deviation rate device corresponding to the rate of turn. The phase detector 117 then energizes the lateral servomotor 119 which rotates shaft 129 to drive pinion 133 that meshes with gear 134 to adjust the lateral position of the axis 113 of the parabola 15 according to the rate of turn of the control craft. A shaft 136 is driven by gearing 137 from the shaft 129 to drive a second input of the compensating differential 131 thereby preventing lateral movements of the parabola 15 about a vertical axis from causing vertical movements of the parabola.

In operation, the axis of the parabola, that is, the reference axis, is adjusted vertically and laterally according to the rate of vertical and lateral deviation of the control craft from a straight course. For example, as the control craft begins to dive, the reference axis 113 (Fig. 4B) is gradually adjusted vertically as the rate of vertical deviation increases. Then as the control craft approaches its desired dive angle, the rate of deviation is gradually reduced and the reference axis is gradually returned to its normal position relative to the control craft.

Since the antenna is adjusted vertically in the opposite direction to the vertical deviation of the control craft as it begins to dive, the controlled craft will not receive erroneous signals to fly upwardly. As the control craft continues to move downwardly, the reference axis also moves downwardly and the controlled craft follows the reference axis. As the control craft approaches its desired dive angle, the antenna returns to its normal position.

The controlled craft will resume its normal position relative to the reference axis, and both the control craft and the controlled craft will be diving at the same angle.

Similarly in turning, the antenna is first adjusted laterally in a direction opposite to the lateral deviation of the control craft. For example, if the control craft turns in a clockwise direction, the antenna is adjusted in a counter-clockwise direction. This avoids erroneous signals in the controlled craft. As the control craft continues turning, the reference axis moves with it in the same direction and the controlled craft follows. As the control craft straightens out on a new course, the antenna returns to its normal position and the controlled craft resumes its normal position after completing a turn substantially identical with that made by the control craft.

Although erroneous signals are eliminated by the apparatus described, the pilot of the controlled craft may still be supplied with an indication of the attitude of the control craft, whereby he may anticipate maneuvers which he will have to make in order to follow the control craft.

The mechanical movement of the reference axis 113 by adjusting the parabola 15 vertically and laterally is, of course, cumbersome in that considerable equipment is required to accurately control the position of the parabola. Another and preferable arrangement for compensating the erroneous signals depends upon the relative attitudes of the leading and following craft. This may be accomplished by a circuit such as that shown in Fig. 5, which is arranged to be connected to leads 61, 62, 63 and 64 corresponding to the outputs of the comparator-detectors 57 and 69, forming the outputs of discriminators 92 and 93, respectively.

The transmitter in the control craft may be the same as that shown in Fig. 1, except that the rate devices 110 and 114 together with the related equipment for vertically and laterally moving the antenna 14 may be eliminated. This is, of course, effectively accomplished by opening switches 115 and 115'.

A gyro vertical or artificial horizon 141 is carried by the controlled craft and has pick-offs 142 and 143 which produce reversible phase and variable magnitude signals corresponding to movements of the controlled craft about its pitch axis in a similar manner to that described in connection with the vertical gyro 74 (Fig. 1). Pick-offs 144 and 145 produce signals corresponding to rolling movements of the controlled craft. The pitching signals of pick-offs 142 and 143 are supplied to a phase detector 148. The output of the phase detector 148 is connected in series with the outputs of the discriminator 92, the elevation comparator-detector 57, and the control circuit for the horizontal pointer 66 of the cross pointer indicator 65.

The lead 96 from one side of the discriminator 92 is connected to one side of the phase detector 148, the other side of which is connected to the indicator 65 that is in turn connected to the lead 61 forming one of the output leads of the elevation comparator-detector 57. The circuit is completed by connecting lead 63 from the comparator-detector 57 to lead 95 of the discriminator 92.

The output of discriminator 92 corresponds to the pitching movements of the control craft, and the output of the phase detector 148 corresponds to pitching movements of the controlled craft.

By properly connecting the discriminator 92 and phase detector 148 so the polarities of their outputs are in opposition, the horizontal pointer is displaced from its central position according to the difference in pitch of the two craft and the vertical displacement of the controlled craft relative to the reference axis. As long as the two craft have the same attitude, the horizontal pointer 66 will be displaced only in accordance with deviation of the following craft from its predetermined position relative to the reference axis 113. Since the pitch of the control craft is changed at the beginning of a change in its elevation, that is, a vertical deviation from a straight course, a signal corresponding to the difference in the attitude of the two craft will move the horizontal pointer 66 in a direction which will indicate to the pilot of the following craft that he should take appropriate action to match the attitude of his craft with that of the control craft.

The introduction of the voltage representing the difference in the attitude of the two craft compensates for errors introduced at the beginning of changes in elevation of the control craft 111 and thus eliminates the necessity for the mechanical control of the parabola 15 (Fig. 1). Therefore the switches 115 and 115' are not closed when the controlled craft has a compensation circuit such as that shown in Fig. 5.

Similarly, voltages of pick-offs 144 and 145 are supplied to a phase detector 152, the output of which is connected by lead 102 to the discriminator 93 and by a lead 153 to the control for the vertical pointer 71 of cross pointer indicator 65. The other side of the vertical pointer circuit is connected by lead 62 to the heading comparator-detector 69 which is connected by lead 64 to lead 101 of discriminator 93, thus forming a series circuit including the comparator-detector 69, discriminator 93, phase detector 152 and indicator 65.

Since it is assumed that the control craft makes standard turns in which the banking angle is determined by the rate of turn, the difference in the rolling movements of the two craft will represent the difference in their respective rates of turn. When the two craft are turning at the same rate and banking at the same angle, the output of phase detector 152 balances the output of discriminator 93 so the vertical pointer 71 is positioned in accordance with the position of the control craft relative to the reference axis 113.

As the leading craft begins to turn, the vertical pointer 71 indicates to the pilot of the following craft that he should turn in the same manner. This circuit eliminates the necessity for lateral adjustment of the parabola 15 by servo motor 119.

Figure 5:
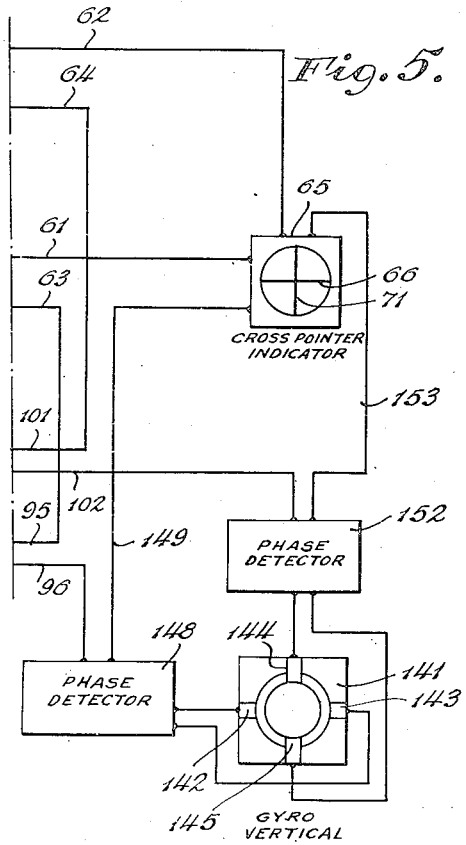
Fig. 5 is a schematic diagram of an indicator circuit for use with the receiver shown in Fig. 3 and compensated to correct errors due to movements of the leading craft.

As has been described, the circuit shown in Fig. 5 provides means for determining the relative attitudes of the two craft, and means for determining the displacement of the following craft from its predetermined position relative to the reference axis. Signals corresponding to the difference in the attitude of the two craft are used to compensate the position determining means to correct errors introduced by deviation from a straight line course, such as changes in heading or elevation, by the control craft.

Figure 6:
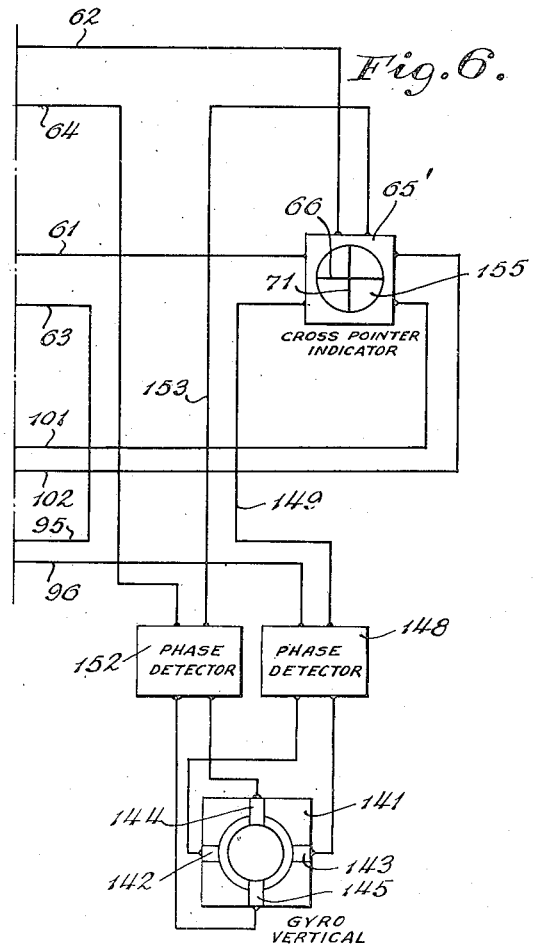
Fig. 6 is a schematic diagram of an indicator circuit similar to that shown in Fig. 5 but including additional data as to the attitude of the leading craft by connections to a novel indicator.

Fig. 6 shows a circuit similar to that of Fig. 5, and in addition includes an indication of banking movements of the control craft. The circuits for controlling horizontal and vertical pointers 66 and 71 are identical with that described in connection with Fig. 5, and similar reference numerals have been used to designate the various components of the circuit. In addition, leads 101 and 102 are connected to control of a novel cross pointer indicator 65' in which the background 155 for the pointers 66 and 71 is rotated about a horizontal axis. Rotation of the background 155 is controlled by voltages of leads 101 and 102 which correspond to rolling movements of the control craft as determined by the discriminator 93. In this manner the pilot, by watching the cross pointer indicator 65', can determine at all times what action he should take to remain in a predetermined position relative to the reference axis of the beam pattern. In addition, he is provided with indications of the banking angle of the control craft which should be the same as his own banking angle.

Fig. 7 illustrates an arrangement for using the receiver shown in Fig. 3 to actuate heading and elevation controls 161 and 162 of an automatic pilot 163, such as that shown in Sperry et al. Patent No. 1,992,970, issued March 5, 1935. In addition, the automatic pilot 163 also includes means for automatically banking the craft in accordance with changes in heading as determined by control 161. One example of a radio controlled automatic pilot which includes this automatic bank feature is disclosed in copending application Serial No. 378,296, filed February 10, 1941 now Patent No. 2,423,336 issued July 1, 1947 in the name of Francis L. Moseley.

Any of the well known automatic pilots for controlling conventional motors 165, 166 and 167 to operate rudder 168; automatically banking by operating ailerons 169 and 171; and to control the elevation by operating elevators 172 and 173, may be used. Such systems are usually provided with follow-up connections 175, 176 and 177 for the motors 165, 166 and 167, respectively.

The heading control is supplied with a voltage corresponding to the voltage which controls the vertical pointer 71 of the cross pointer indicator 65 in Fig. 5. The circuit for the heading control 161 is a series circuit including the outputs of the discriminator 93, the heading comparator-detector 69, and phase detector 148. This voltage represents the difference in the banking angles of the control craft and the controlled craft, as well as deviation of the latter from its predetermined position relative to the reference axis. Thus the heading control 161 actuates an automatic pilot to maintain the following craft in its predetermined position relative to the reference axis and also to cause it to follow turning movements of the control craft.

The elevation control 162 of the automatic pilot is connected in a series circuit including the elevation comparator-detector 57, the pitch discriminator 92 and phase detector 152. The elevation control 162 is thus controlled by voltages corresponding to the difference in pitch of the two craft and the vertical displacement of the following craft from its predetermined position relative to the reference axis. In this manner the automatic pilot 163 is actuated to maintain the craft in its predetermined position relative to the reference axis and also to control the attitude of the craft in accordance with the attitude of the control craft.

Figure 8:
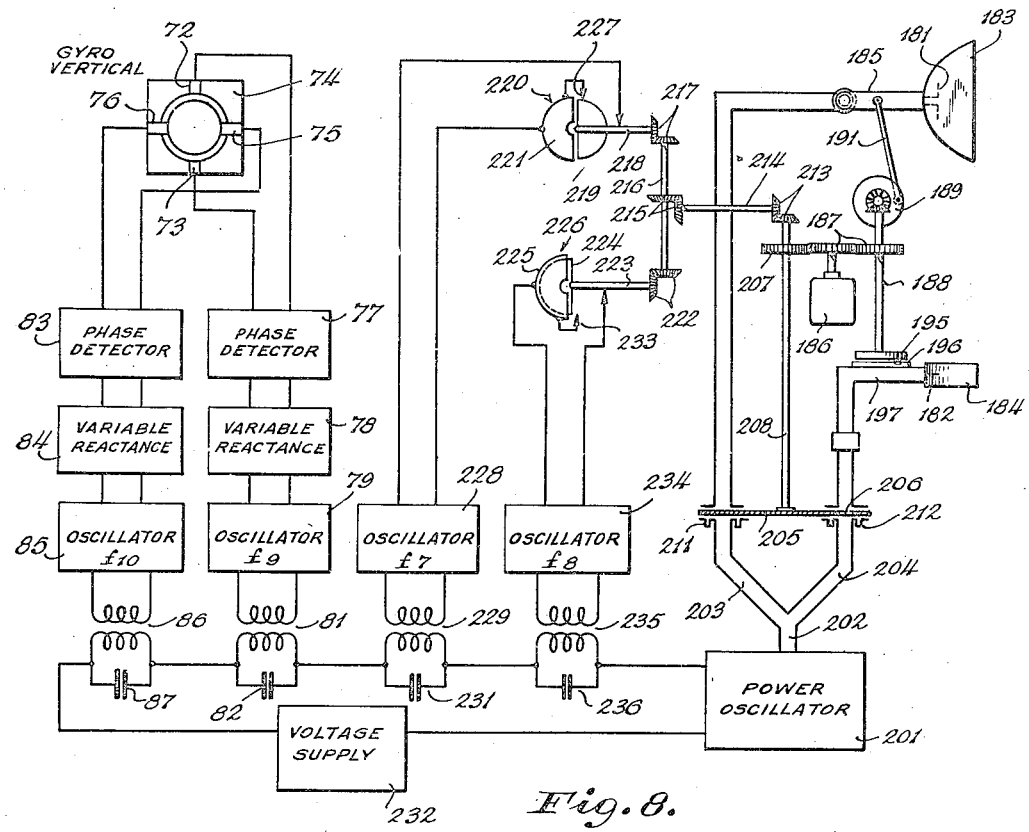
Fig. 8 is a schematic diagram of a modified form of transmitter for defining a reference axis.

A different arrangement for utilizing a radio beam to define a reference axis for the formation is illustrated in Fig. 8. The transmitter shown in Fig. 8 includes a pair of antennae 181 and 182 having cylindrical parabolic reflectors 183 and 184 designed to provide fan-shaped directional beam patterns. Cylindrical parabola 183 is arranged so the radiation pattern of antenna 181 has a narrow lateral dimension and a comparatively wide vertical dimension. The fan-shaped beam of antenna 182 is rotated through 90° so its narrow dimension is in a vertical direction and its wide dimension in a lateral direction.

Figure 9:
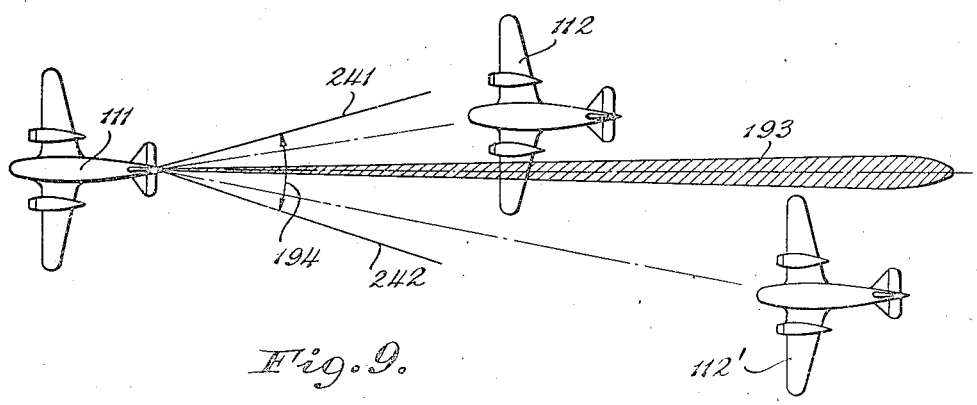
Fig. 9 shows the positions of the craft in a formation relative to the beam patterns radiated by the transmitter shown in Fig. 8.

The beam pattern of antenna 181 is swept laterally by oscillating wave guide 185 which supports the antenna. Oscillation of the wave guide 185 in a horizontal plane is accomplished by a motor 186 which drives through suitable gearing 187 to rotate a shaft 188 which is geared to a disc 189 having a lever 191 eccentrically mounted thereon and connected to the wave guide 185. The motor 186 is driven at a speed selected to oscillate the wave guide 185 and the antenna 181 at their natural frequency, so the fan-shaped beam is harmonically oscillated laterally through a selected angle as shown in Fig. 9. The beam from the antenna 181 may have a pattern such as that shown at 193 in Fig. 9 that sweeps through an angle 194 at the rear of the control craft 111.

The fan-shaped beam of antenna 182 is swept through a path at 90° to the path through which the antenna 181 is moved. The shaft 188 drives through disc 195 and crank arm 196 to oscillate wave guide 197 at its natural frequency and sweep the antenna 182 in a vertical direction. Considering the beam patterns of the antennae 181 and 182 as vertical and lateral planes of radiant energy, it will be apparent that the sweeping motion of the antennae moves the two planes of energy in lateral and vertical directions, respectively.

The fan-shaped beams of the two antennae are used to define a reference axis by modulating the high frequency energy in accordance with their angular positions relative to the longitudinal axis of the control craft 111.

A power oscillator 201 supplies high frequency energy through wave guide 202 to branch wave guides 203 and 204 that are connected to the wave guides 185 and 197 for the antennae 181 and 182, respectively. The high frequency energy from the power oscillator is supplied alternately to the two antennae by a switch in the form of a disc 205 which rotates through the wave guides 203 and 204 and has a semi-circular slot 206 adapted to permit the high frequency energy to continue along the wave guides 203 and 204 during alternate halves of each revolution of the disc 205. The disc 205 is driven in synchronism with the oscillation of the antennae by motor 186 which drives through gear 207 and shaft 208 to rotate the switching disc 205.

The slot 206 is so positioned that each of the antennae is supplied with energy during the sweep of its fanning movement in one direction but cut off during its return sweep. Since the antennae sweep synchronously, the energy is supplied alternately during their respective sweeping movements. Suitable high frequency chokes 211 and 212 may be formed in the wave guides 203 and 204 to prevent leakage of energy around the disc 205.

One manner of modulating the fan-shaped beams of antennae 181 and 182 as they are swept laterally and vertically relative to the longitudinal axis of the control craft, is by varying the frequency of the power oscillator 201 in accordance with sweeping movements of the antennae. This may be accomplished in the following manner.

A shaft 208 drives through gearing 213, shaft 214, and gearing 215, to rotate shaft 216 synchronously with fanning movements of the antennae. Shaft 216 drives through gearing 217 to rotate shaft 218, which in turn rotates a rotary plate 219 of a condenser 220 having a stationary plate 221. The plates of the condenser 220 may be connected in parallel with the main tuning condenser of an oscillator 228, whereby the frequency of the oscillator 228 is varied slightly on either side of its normal frequency $f_7$ as the condenser plate 219 is rotated synchronously with fanning movements of the antennae.

The shaft 216 also drives through gearing 222 to rotate the shaft 223, on which is mounted a rotary plate 224 of a second condenser 226 having a stationary plate 225. The plates 224 and 225 may be connected in parallel with the main tuning condenser of an oscillator 234, whereby the frequency of the oscillator is varied on each side of its normal frequency $f_8$ as the rotary plate 224 revolves.

The oscillator 228 may be coupled by a transformer 229 to the circuit including high voltage supply 232 and power oscillator 201. The secondary of the transformer 229 may be tuned as by condenser 231. In this manner, the output of the power oscillator 201 is frequency modulated in accordance with the frequency of the modulating oscillator 228, and since the frequency of the modulating oscillator 228 varies in accordance with the oscillation of the antennae, the power oscillator 201 is frequency modulated by a modulating frequency which varies according to the sweeping movements of the antennae.

Similarly, the oscillator 234 is coupled as by a transformer 235, having its secondary tuned by a condenser 236, to the circuit of high voltage supply 232 of power oscillator 201. The frequency of the modulating oscillator 234 is thereby varied by rotation of condenser plate 224 in accordance with sweeping movements of the antennae.

It is desired to have one of the modulating oscillators used for each of the antennae 181 and 182. The modulating frequency of oscillator 228 may be applied during the period that switching disc 205 supplies energy to the antenna 181 and the modulation frequency of oscillator 234 applied during the alternate half of each revolution of the disc 205 when the antenna 182 is connected to the power oscillator 201.

The variable condensers may also be used to alternately cut-off the ocillators 228 and 234 synchronously with operation of the high frequency switch 205 so the frequency of only one modulating oscillator is supplied to each antenna. A brush 227 may be connected to the stator plate 221 of condenser 220 and adapted to engage rotor plate 219 during one-half of each revolution. This will effectively short circuit the tank circuit of the oscillator 228 to disrupt oscillation during sweeping movements of the antennae in one direction. When the plate 219 becomes disengaged from the brush 227, the oscillator 228 begins oscillating and its frequency varies as the rotary plate 219 is rotated. In a similar manner a brush 233 is connected to stator plate 225 and is adapted to engage rotary plate 224 during one half of each revolution. The brushes 227 and 233 are, of course, arranged to engage their respective rotary plates during alternate halves of each rotation cycle, whereby the oscillator 228 is cut-off during sweeping movements of the antennae in one direction, and the oscillator 234 is cut-off during sweeping movements of the antennae in the opposite direction.

Referring again to Fig. 9, it may be assumed that the fan-shaped beam 193 has a low modulating frequency when its axis corresponds to the axis 241, a high frequency when its axis corresponds to the axis 242, and a central frequency when in its middle position as shown. A following plane in the formation, such as the plane 112, will receive a different modulating frequency than that received by a plane 112′ in a different position. The frequency received by the planes in the formation varies according to their position relative to the central or reference axis of the control craft 111. The modulation frequency of the beam 193 when in its central position, as shown in Fig. 9, is the central frequency $f_7$ of the oscillator 228. The central modulation frequency of the beam radiated by antenna 182 is the center frequency $f_8$ of the oscillator 234 and defines the vertical position of the reference axis. Obviously, these frequencies must be chosen so they will not interfere with each other so the receivers in the planes in the formation will be able to distinguish between the two modulating frequency ranges.

A receiver suitable for use with the transmitter shown in Fig. 8 is illustrated in Fig. 10. This receiver includes an antenna 245 connected as by coaxial cable 247 to a suitable receiver 248, that may include conventional limiter and demodulator circuits, the output of which is connected to a band-pass amplifier 249. A heading discriminator 251 and an elevation discriminator 252 are connected in parallel to the output of the band-pass amplifier 249. The heading and elevation discriminators 251 and 252 are variable as shown in the drawings and may be tuned to different center frequencies. The output of the heading discriminator 251 is connected by leads 254 and 255 to control vertical pointer 256 of cross pointer indicator 257. Output leads 258 and 259 of the elevation discriminator 252 are connected to control a horizontal pointer 261 of the cross pointer indicator 257.

If the heading discriminator 251 is tuned to the center modulating frequency of the variable oscillator 228 the output voltage of leads 254 and 255, relative to a neutral point in the discriminator, corresponds to the difference between the modulating frequency received by the antenna 245 and the central modulating frequency to which the discriminator 251 is tuned. This voltage is therefore proportional to the displacement of the receiving antenna 245 relative to the reference axis defined by the fanning beam of antenna 181 on the control craft. For example, if the antenna 245 is carried by the plane 112 (Fig. 9), it will receive a lower modulating frequency than the central modulating frequency. In this case the voltage of the leads 254 and 255 relative to a neutral point of the discriminator 251 differs considerably and the vertical pointer 256 is displaced from its central position in a direction depending upon the received modulating frequency.

If it is desired to have the vertical pointer 256 appear in its center position when the following plane is displaced laterally a predetermined distance from the vertical axis, the discriminator 251 is tuned to a frequency which it would receive at such a displacement. For example, the craft 112 (Fig. 9) would have its discriminator tuned to a frequency lower than the center frequency and the vertical pointer would be centrally positioned when the lower frequency was received by the antenna 245.

The voltage of leads 258 and 259 forming the output of elevation discriminator 252 is determined by the vertical position of the antenna 245 relative to the reference axis which determines the frequency of the modulating signal received by the antenna. The elevation discriminator 252 is variable and may be tuned to a frequency other than the center frequency of the transmitter in which case the horizontal pointer 261 will be centrally located when the craft carrying the antenna 245 is vertically displaced a predetermined distance relative to the reference axis.

The transmitter as shown in Fig. 8 radiates frequency modulated energy; however, it may be modified to radiate an amplitude modulated signal, in which case the receiving circuit shown in Fig. 10 would have to be modified accordingly. However, the modulating frequency would still vary in accordance with the fanning movements of the two antennae and discriminators 251 and 252 would be employed to detect lateral and vertical deviations of the controlled craft from its predetermined position relative to the reference axis defined by the beams.

As shown in Fig. 8, the vertical gyro 74 may be used to modulate the output of power oscillator 201 in the same manner as the vertical gyro 74 (Fig. 1) was used to modulate the power oscillator 11. Thus the voltage developed by pick-offs 72 and 73 is supplied to the phase detector 77 to control the variable reactance 78 which varies the frequency of oscillator 79 in accordance with the pitching movements of the control craft. Similarly, pick-offs 75 and 76 supply a voltage to the phase detector 83 which controls variable reactance 84 to vary the frequency of oscillator 85 in accordance with rolling movements of the control craft. The varying frequencies ($f_9$ and $f_{10}$) of oscillators 79 and 85 are coupled by transformers 81 and 86 to the voltage supply circuit of power oscillator 201 in the same manner as that described in connection with Fig. 1. Thus the frequency of the power oscillator 201 is also modulated by frequencies which vary according to the attitude of the control craft.

The receiver shown in Fig. 10 includes pitch and roll discriminators 265 and 266 which are tuned to center frequencies $f_9$ and $f_{10}$ respectively. Changes in attitude of the control craft cause the pick-offs of the gyro vertical 74 to change the frequency modulators 79 and 85 from their center frequency. These changed frequencies cause discriminators 265 and 266 to produce voltages according to the changes in attitude of the control craft.

Leads 271 and 272, representing the output of pitch discriminator 265, are connected to control vertical movements of a miniature aircraft 273 of the horizon repeater indicator 274. Output from leads 275 and 276 of the roll discriminator 266 control rotary movements of the miniature aircraft 273 according to the rolling movements of the control craft.

The receiver shown in Fig. 10 provides the same indications as that shown in Fig. 3, namely, the deviation of the craft from a predetermined position relative to the reference axis defined by the transmitter of the control craft, and also the attitude of the control craft, that is, its pitching and rolling movements. It will be apparent that the outputs of discriminators 251, 252, 266 and 265 could be connected directly to the indicating circuits shown in Figs. 5 and 6 or to the automatic pilot circuit shown in Fig. 7.

To accomplish this, lead 254 will be connected to lead 62; lead 255 connected to lead 64; lead 258 connected to lead 61; lead 259 connected to lead 63; lead 272 connected to lead 101; lead 271 connected to lead 102; lead 276 connected to lead 95; and lead 275 connected to lead 96.

The discriminators 265 and 266 correspond to the discriminators 93 and 95 shown in Fig. 3. The outputs of discriminators 251 and 252 provide direct current voltages of direction and magnitude corresponding to the direction and amount of lateral and vertical displacements of the receiver relative to the reference axis. Thus, these voltages are similar to those produced by the heading and elevation comparator-detectors 69 and 57, respectively.

The two systems for defining the reference axis thus far described are adapted for use with either formation flying aircraft or a formation of gliders towed by a single aircraft. Since a formation of gliders must be connected by a tow line to a towing aircraft, it is possible to accomplish the formation control without using radio beams to define the reference axis. The tow line itself may be used to determine deviation of the gliders from predetermined positions relative to the reference axis.

One arrangement for glider towing is shown in Fig. 11 in which a housing 301 is rigidly supported on the towing craft as by a bracket 302 and has a ball and socket joint 303 for a towing connector rod 304 adapted to attach a tow line to the towing craft. The ball and socket joint 303 provides universal movement of the connector 304 relative to the towing craft.

Since the tow line is drawn tightly, the position of the connector 304 represents the approximate angular position of a line drawn from the towing craft to the glider. However, the tow line is subject to vibration and "slapping" due to extraneous forces acting thereon, so the connector 304 is dampened as by dashpots 306 and 307 connected between the connector 304 and the housing 301.

A link 311 is connected between the connector rod 304 and an arm 312 of a potentiometer 313 to displace the slider according to vertical movements of the connector 304. A similar link 314 is connected to slider 315 of potentiometer 316 to displace the slider according to lateral movements of the connector 304. A suitable source of voltage, such as battery 318, is connected across the potentiometers 313 and 316 and has its mid-point connected to a lead 319. It will be apparent that the voltages of the sliders 312 and 315 are of a sense and magnitude relative to the lead 319 corresponding to the vertical and lateral displacements of the connector 304 relative to the axis of the housing 301, which forms the reference axis of the formation.

Potentiometer slider 312 is connected by lead 321 in series with a phase detector 323 that is actuated according to pitching movements of the towing craft as determined by pick-offs 324 and 325 of vertical gyro 326. Lead 328 from the other side of the phase detector 323 is connected through the tow line to one side of a phase detector 331, that is actuated by voltages from the pick-offs 333 and 334 of gyro vertical 335 corresponding to the pitching movements of the glider. Phase detector 331 is connected by lead 336 to control horizontal pointer 337 of the cross pointer indicator 338. The return circuit for the horizontal pointer circuit is through the neutral lead 319 in the tow line to the center terminal of battery 318. The circuit of potentiometer slider 312, phase detector 323, phase detector 331 and horizontal pointer 337 is a series circuit similar to that described in connection with Fig. 5 for controlling the horizontal pointer in accordance with the difference in pitching angles of the two craft as well as the deviation of the glider relative to the reference axis.

Similarly, the slider 315 is connected by lead 341 to phase detector 342 that is actuated in accordance with rolling movements of the towing craft is determined by voltages from pick-offs 344 and 345. The other side of phase detector 342 is connected by lead 346 through the tow line to phase detector 347 that is supplied with voltages corresponding to rolling movements of the glider as determined by pick-offs 349 and 351 of the vertical gyro 75. The phase detector 347 is also connected by lead 352 to the control circuit for horizontal pointer 337, the return path of which is formed by the neutral lead 319 through the tow line to the central terminal of the battery 318. The vertical pointer 353 is thereby positioned in accordance with the difference in the rolling movements of the towing craft and the glider, as well as the deviation of the glider from a predetermined position relative to the reference axis.

Cross pointer indicator 338 thus has its pointers centrally located when the towing craft and the glider have the same attitude and the glider is in a predetermined position relative to the reference axis of housing 301. If the glider deviates from this position the potentiometers will produce voltages to move the pointers corresponding to the direction and amount of lateral and vertical deviation. If the towing craft changes its attitude a similar indication will appear, at which time the glider pilot may adjust the attitude of the glider to match that of the towing craft. The use of the voltages corresponding to the difference in attitudes of the two craft compensates for errors in the reference axis due to changes in attitude of the towing craft.

A simplified arrangement of the system shown in Fig. 11 is illustrated in Fig. 12 in which the glider is supplied with an indication of the attitude of the towing craft and its position relative to the reference axis. This system does not compensate for errors in the reference axis due to changes in the attitude of the towing craft. The towing connector 304 actuates potentiometer sliders 312 and 315 in the same manner as that described in connection with Fig. 11 to provide voltages corresponding to movements of the tow-line relative to the reference axis of the towing craft. These voltages correspond to the position of the glider relative to the reference axis. The voltage of slider 312 is connected as by lead 361 through the tow line to the circuit of horizontal pointer 362 of the cross pointer indicator 363. The return of the horizontal pointer circuit is by way of neutral lead 364 through the tow line to the center point of the battery 318. The voltage of slider 315 is connected by lead 365 through the tow line to the circuit of vertical pointer 366, the return circuit thereof being through neutral lead 364. The pointers of the cross pointer indicator 363 are thereby positioned in accordance with the position of the connector 304 relative to the reference axis of the housing 301. These voltages correspond to the vertical and lateral displacements of the glider relative to the reference axis.

A gyro vertical 367 carried by the towing craft acts through phase detectors 368 and 369 to apply voltages to horizon repeater indicator 371 as by leads 372 and 373 corresponding to pitch and roll voltages determined by the pick-offs of the gyro vertical 367. The return path for these voltages is by way of neutral lead 364. In this manner a miniature aircraft 374 of the indicator 371 is moved vertically and rotated about a horizontal axis according to the pitch and roll of the towing craft and provides the glider pilot with an indication of the attitude of the towing craft. This simplified arrangement may be desirable where considerations of weight and space are essential for certain types of gliders. The indications of the cross pointer indicator are not compensated to correct errors caused by maneuvers of the towing craft. However, the pilot through practice may anticipate such maneuvers by observing the horizon repeater indicator 371.

Three types of systems for formation control have been described herein and several types of indicating, as well as automatic pilot circuits, have been included. It should be understood that the various indicating circuits and the automatic pilot circuits may be adapted for use with any of the three formation control systems.

Each of the systems has a transmitter which determines a reference axis for the formation. Receivers carried by the various craft in the formation determine the position of the respective craft relative to the reference axis of the transmitters and also determine the attitude of the control craft which carries the transmitter. In addition, some of the indicating circuits and the automatic pilot circuit described have compensating means for correcting errors in the reference axis due to movements of the control craft. This compensation may be effected either by adjusting the position of the reference axis or comparing the attitudes of the respective craft. In the latter case, the receivers include means for determining the difference in the attitudes of the respective craft.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a glider control system, a following craft connected by a tow line to a leading craft, an attitude indicating device carried by said leading craft, a signal generator carried by said leading craft and responsive to the position of said tow line for producing signals corresponding to the position of said tow line relative to said leading craft, means responsive to said device for modifying said signals in accordance with movements of said leading craft, and means carried by said following craft and responsive to said signals for determining the position of said following craft relative to said leading craft.

2. In a glider control system, a following craft connected by a tow line to a leading craft, an attitude indicating device carried by said leading craft, a signal generator responsive to the position of said tow line for producing a signal corresponding to the position of said tow line relative to said leading craft, means responsive to said device for modifying said signal in accordance with changes in attitude of said leading craft, a second attitude determining device carried by said following craft, and means responsive to said signals and said second device for determining the difference in attitude positions of said two craft.

3. A glider control system comprising a following craft connected by a tow line to a leading craft, a signal generator responsive to the position of said tow line for producing signals corresponding to the position of said tow line relative to said leading craft, an attitude indicating device carried by said leading craft for producing signals corresponding to the attitude of said leading craft, and means in said following craft connected to said signal generator and said attitude device for ascertaining the attitude of said leading craft and the position of said following craft relative thereto.

4. A glider control system comprising a following craft connected by a tow line to a leading craft, a signal generator responsive to the position of said tow line for producing signals corresponding to the position of said tow line relative to said leading craft, an attitude indicating device carried by said leading craft for producing signals corresponding to the attitude of said leading craft, a second attitude indicating device carried by said following craft, and means connected to said generator and said devices for determining the difference in attitude of said two craft and the position of said following craft relative to said leading craft.

5. A formation control system comprising a transmitter mountable in a first craft producing signals dependent upon angular deviation from a reference axis having a predetermined angular relationship to an axis of said craft, an attitude indicating device for modulating said transmitter signals, a receiver carried by a second craft and responsive to said transmitter, a second attitude indicating device carried by said second craft, an indicator responsive to said receiver for indicating the position of said second craft relative to said axis, and an indicator responsive to said second device and said receiver for indicating the difference in attitude of said two craft.

6. A formation control system comprising a transmitter mountable in a first craft producing signals dependent upon angular deviation from a reference axis having a predetermined angular relationship to an axis of said craft, an attitude indicating device for modulating said transmitter signals, a receiver carried by a second craft and responsive to said transmitter, a second attitude indicating device carried by said second craft, and an automatic pilot responsive to said receiver and said second device for maintaining said second craft in a predetermined position and relative to said axis, and a predetermined attitude relative to said one craft.

7. In a craft guidance system, generating and transmitting means mountable on a first craft producing signals dependent upon angular deviation from a reference axis having a predetermined angular relationship to an axis of said craft, receiving and reproducing means mountable on a second craft responsive to said signals for determining the deviation of said second craft from said reference axis, and means for modifying the direction of said signals to compensate for movements of said reference axis caused by attitude changes of said first craft.

8. In a craft guidance system, an attitude indicating device mountable on a first craft and generating impulses, generating and transmitting means mountable on said craft producing signals dependent upon angular deviation from a reference axis having a predetermined angular relationship to an axis of said craft, said signals being altered by said device in accordance with changes in attitude of said first craft to produce resultant signals, receiving and reproducing means mountable in a second craft and responsive to said resultant signals, a second attitude indicating device generating impulses and carried by said second craft, and means responsive to the algebraic sum of the impulses from said devices and to the input of said receiving and reproducing means for determining the difference in the attitudes of said two craft.

9. In a craft guidance system, an attitude indicating device mountable on a first craft and generating impulses, a transmitter mountable on said craft producing signals dependent upon angular deviation from a reference axis having a predetermined angular relationship to an axis of said craft, said signals being further altered by said device in accordance with changes in attitude of said first craft to produce resultant signals, a receiver mountable in a second craft and responsive to said resultant signals for ascertaining the position of said reference axis and the attitude of said first craft, an attitude indicating device generating impulses and mountable in said second craft, and means responsive to the algebraic sum of impulses from said devices for modifying the signal input to said receiver to compensate for the difference in the attitudes of said two craft.

10. In a craft flight formation guidance system, an attitude indicating device mountable in a first craft, a transmitter mountable in said first craft producing signals dependent upon angular deviation from a reference axis having a predetermined angular relationship to an axis of said craft, said signals being further altered by said device to produce resultant signals, a second attitude indicating device mountable in a second craft, a receiver mountable in a second craft and responsive to said resultant signals, and an indicator actuated by said receiver and said second attitude indicating device for providing a guidance indication on said second craft.

11. In a craft formation control system, an attitude indicating device mountable in a first craft, a transmitter mountable on said first craft producing signals dependent upon angular deviation from a reference axis having a predetermined relationship to an axis of said craft and actuated by said device to produce signals characterizing attitude changes of said craft, a second attitude indicating device carried by a second craft, a receiver mountable in said second craft responsive to said signals, and an automatic pilot responsive to said signals and said second device for maintaining said second craft in a predetermined position relative to said axis.

12. In a craft guidance system, a transmitter mountable in a craft producing signals dependent upon angular deviation from a reference axis having a predetermined angular relationship to an axis of said craft, a deviation rate device carried by said craft for determining the rate of attitude changes of said craft from a predetermined line of flight, and means responsive to said rate device for positionally modifying said axis to compensate for changing attitude movements of said craft.

13. In a craft guidance system, a transmitter mountable on a craft producing signals dependent upon angular deviation from a reference axis having a predetermined angular relationship to an axis of said craft, a device carried by said craft for determining the rate of deviation thereof from a straight course, and means responsive to said device for changing the direction of said signals of said transmitter during course changes of said craft to compensate for such changes.

14. In a craft guidance system, a transmitter mountable on a craft producing signals dependent upon angular deviation from a reference having a predetermined angular relationship to an axis of said craft, and means responsive to the rate of deviation of said craft from a straight course for changing the angular position of said reference axis to compensate for said deviation.

15. A craft guidance system comprising a transmitter mountable on a first craft producing first modulated signals dependent upon angular deviation from a reference axis having a predetermined angular relationship to an axis of said first craft, an attitude indicating device on said first craft for additionally modulating said signals, and a receiver mountable on said second craft and responsive to said first modulated signals for determining the position of said second craft relative to said axis and to said additional modulation for determining the attitude of said first craft.

16. A craft guidance system comprising an attitude indicating device mountable on a first craft, signalling apparatus including a transmitter mountable on said craft producing signals dependent upon angular deviation from a reference axis having a predetermined angular relationship to an axis of said first craft, a receiver carried by a second craft responsive to said signals for determining the deviation of said second craft from said reference axis, and compensating means responsive to said attitude indicating device for changing the angular position of said reference axis to compensate for attitude changes of said first craft.

17. A craft guidance system comprising a transmitter mountable in a first craft producing first modulated signals dependent upon angular deviation from a reference axis having a predetermined angular relationship to an axis of said first craft, an attitude indicating device mountable in said first craft for additionally modulating said transmitter signals, a receiver mountable in a second craft and responsive to said transmitter signals, and indicating means mountable in said second craft and responsive to the input signals of said receiver for indicating both the attitude of said first craft and the position of said second craft relative to said reference axis.

18. A craft flight formation control system comprising a transmitter mountable on a craft producing signals dependent upon angular deviation from a reference axis having a predetermined angular relationship to an axis of said craft, an attitude indicating device mountable in said first craft for modulating said signals, a receiver carried by a second craft and responsive to said modulated signals, and an automatic pilot responsive to said receiver for maintaining said second craft in a predetermined position relative to said reference axis.

19. A craft guidance system comprising an attitude indicating device mountable in a first craft, signalling apparatus including a transmitter mountable on a craft producing signals dependent upon angular deviation from a reference axis having a predetermined angular relationship to an axis of said craft, a receiver mountable in a second craft and responsive to said transmitter signals, compensating means responsive to said device for modifying the direction of the output of said signalling apparatus to compensate for changes in attitude of said one craft, and an indicator responsive to said receiver for indicating the position of said second craft relative to said axis.

20. A craft formation control system comprising an attitude indicating device mountable in a first craft, signalling apparatus including a transmitter mountable on an aircraft producing signals dependent upon angular deviation from a reference axis having a predetermined angular relationship to an axis of said craft and including a receiver mountable in a second craft and responsive to said transmitter signals, compensating means responsive to said device for changing the output of said signalling apparatus to compensate for changes of attitude of said first craft, and an automatic pilot responsive to said receiver for maintaining said second craft in a predetermined position relative to said reference axis.

21. A craft flight formation control system comprising a transmitter mountable on a first craft, a directional beam antenna coupled thereto emitting symmetrically oriented patterns of radiant energy signals about a reference axis having a predetermined angular relationship to an axis of said craft, an attitude responsive device mountable on said craft, means responsive to said device for modulating said transmitter signals, and a receiver carried by a second craft and responsive to the modulation of said transmitter for determining the position of said second craft relative to said reference axis and for determining the attitude of said first craft.

FREDERIC A. JENKS.

REFERENCES CITED

The following references are of record in the file of this patent:

UNITED STATES PATENTS

| Number | Name | Date |
|---|---|---|
| 541,286 | Moore | June 18, 1895 |
| 1,149,122 | Fuller | Aug. 3, 1915 |
| 1,225,796 | Fricke | May 15, 1917 |
| 1,638,417 | Sperry | Aug. 9, 1927 |
| 1,666,897 | Hammond | Apr. 24, 1928 |
| 1,983,079 | Hansen | Dec. 4, 1934 |
| 1,985,265 | Smith | Dec. 25, 1934 |
| 1,987,680 | Henderson | Jan. 15, 1935 |
| 2,119,530 | Dunmore | June 7, 1938 |
| 2,158,584 | Koster | May 16, 1939 |
| 2,170,835 | Simon | Aug. 29, 1939 |
| 2,176,469 | Moueix | Oct. 17, 1939 |
| 2,257,320 | Williams | Sept. 30, 1941 |
| 2,262,033 | Moseley | Nov. 11, 1941 |
| 2,262,245 | Moseley | Nov. 11, 1941 |
| 2,296,032 | Hammond | Sept. 15, 1942 |
| 2,362,832 | Land | Nov. 14, 1944 |
| 2,396,453 | Windle | Mar. 12, 1946 |
| 2,400,400 | Duer | May 14, 1946 |

FOREIGN PATENTS

| Number | Country | Date |
|---|---|---|
| 524,876 | Great Britain | Aug. 16, 1940 |